(12) United States Patent
Zhao et al.

(10) Patent No.: US 11,631,007 B2
(45) Date of Patent: Apr. 18, 2023

(54) METHOD AND DEVICE FOR TEXT-ENHANCED KNOWLEDGE GRAPH JOINT REPRESENTATION LEARNING

(71) Applicant: HUAZHONG UNIVERSITY OF SCIENCE AND TECHNOLOGY, Wuhan (CN)

(72) Inventors: Feng Zhao, Wuhan (CN); Tao Xu, Wuhan (CN); Langjunqing Jin, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 224 days.

(21) Appl. No.: 17/169,869

(22) Filed: Feb. 8, 2021

(65) Prior Publication Data

US 2022/0147836 A1    May 12, 2022

(30) Foreign Application Priority Data

Nov. 6, 2020  (CN) .......................... 202011235607.X

(51) Int. Cl.
*G06F 40/295* (2020.01)
*G06N 5/02* (2023.01)
(Continued)

(52) U.S. Cl.
CPC ............ *G06N 5/02* (2013.01); *G06F 40/295* (2020.01); *G06F 40/30* (2020.01); *G06N 3/048* (2023.01); *G06N 3/08* (2013.01)

(58) Field of Classification Search
None
See application file for complete search history.

(56) References Cited

PUBLICATIONS ( A Model of Text-Enhanced Knowledge Graph Representation Learning With Mutual Attention; A Model of Text-Enhanced Knowledge Graph Representation Learning With Mutual Attention; Jan. 31, 2020; URL: https://ieeexplore.ieee.org/stamp/stamp.jsp?tp=&arnumber=9037292 (Year: 2021).*

(Continued)

*Primary Examiner* — Richa Mishra
(74) *Attorney, Agent, or Firm* — Michael X. Ye; Rimon Law

(57) ABSTRACT

The present invention relates to method and device for text-enhanced knowledge graph joint representation learning, the method at least comprises: learning a structure vector representation based on entity objects and their relation linking in a knowledge graph and forming structure representation vectors; discriminating credibility of reliable feature information and building an attention mechanism model, aggregating vectors of different sentences and obtain association-discriminated text representation vectors; and building a joint representation learning model, and using a dynamic parameter-generating strategy to perform joint learning for the text representation vectors and the structure representation vectors based on the joint representation learning model. The present invention selective enhances entity/relation vectors based on significance of associated texts, so as to provide improved semantic expressiveness, and uses 2D convolution operations to train joint representation vectors. As compared to traditional translation models, the disclosed model has better performance in tasks like link prediction and triad classification.

6 Claims, 2 Drawing Sheets

(51) Int. Cl.
    *G06F 40/30*     (2020.01)
    *G06N 3/08*     (2023.01)
    *G06N 3/048*     (2023.01)

(56) References Cited

PUBLICATIONS

Bo An, Bo Chen, Xianpei Han, Le Sun; Accurate Text-Enhanced Knowledge Graph Representation Learning; Jun. 2018 URL: https://aclanthology.org/N18-1068.pdf (Year: 2018).*

Jun Li, Guimin Huang, Jianheng Chen, and Yabing Wang; Dual CNN for Relation Extraction with Knowledge-Based Attention and Word Embeddings; Jan. 29, 2019; URL https://www.hindawi.com/journals/cin/2019/6789520/ (Year: 2019).*

Fengyuan Lu , Peijin Cong , and Xinli Huang; Utilizing Textual Information in Knowledge Graph Embedding: A Survey of Methods and Applications; May 11, 2020; URL: https://ieeexplore.ieee.org/stamp/stamp.jsp?tp=&arnumber=9094215 (Year: 2020).*

* cited by examiner

METHOD AND DEVICE FOR TEXT-ENHANCED KNOWLEDGE GRAPH JOINT REPRESENTATION LEARNING

CROSS-REFERENCE TO RELATED APPLICATIONS

This application claims the benefit of the Chinese Patent Application No. CN202011235607.X filed on Nov. 6, 2020, which is hereby incorporated by reference as if fully set forth herein.

BACKGROUND

1. Technical Field

The present invention relates to field of natural language processing technology, and more particularly to a method and a device for text-enhanced knowledge graph joint representation learning.

2. Description of Related Art

A knowledge graph is in nature a knowledge base, in which data are structured in the form of a directional graph. Therein, each node in the graph represent an entity or a concept, and each edge represents a semantic relation between the connected entities/concepts. The basic unit of a knowledge graph is denoted by a knowledge triad (h,r,t). The existing knowledge graphs are usually imperfect for their sparse data relation information, and thus perform far below expectation in applications such as question answering and intelligence recommendation. Knowledge graph completion is a technology for predicting mossing entity facts or relation facts thereby completing structure information of a knowledge graph, so is contributive to good accuracy and interpretability of reasoning computation of a knowledge graph in applications. Due to the structural specificity of knowledge bases, many modal information data, such as text data, are not sufficiently used. With text-enhanced representation learning, people can make good use of the rich semantic information of these text data and fuse text information associated with knowledge basest to further enhance semantic representation of entity/relation vectors, thereby improving interpretability of computation models.

In recent years, knowledge graph representation learning technologies, with deep learning as a representative example, predict the complicated semantic information between entities and relations by means of extracting data features and normalizing computation processes; representing semantic information of entities and relations as low-dimension continuous space vectors; and computing these vectors, so as to significantly improve efficiency in graph data linking prediction and reasoning computation. Translation concept models have developed into a research hotspot in recent years. Such models realize normalized representation of knowledge vectors by regarding relation vectors as shifts between entity vectors. However, common translation models only use internal structure information of knowledge bases for representation learning, and thus have problems such as high fit and low semantic interpretability. Text description information is also increasingly used in knowledge-graph-based representation learning. This technology trains text word vectors with word2vec, and introduces external text information to support structure vectors, thereby obtaining more reasonable results of relation prediction.

For example, China Patent Publication No. CN107423820B discloses a knowledge graph representation learning method combined with entity hierarchy categories, which comprises the following steps: acquiring a triple relation of a knowledge graph and hierarchy structure category information of an entity; constructing a category mapping matrix of the entity under a preset triple according to the category information of the hierarchy structure of the entity; constructing an energy equation according to the entity vector and the relation vector of the triple relation and the category mapping matrix; and constructing a marginal-based evaluation function according to an energy equation, and learning the representation of the entity vector, the relation vector and the class mapping matrix by minimizing the evaluation function.

While the known text-enhanced knowledge graph representation learning model well demonstrates that text information is of great help for knowledge representation learning, study of this topic is still in its early stage and have issues to be addressed:

(1) The existing works of knowledge graph representation learning incorporating entity description mostly use bag-of-words models to train representation of entity description without paying attention to word orders in entity description and thus miss contextual connection; and (2) The existing works fail to effectively discriminate significance of various texts associated with entities.

Hence, how to incorporate external key text information into knowledge graph representation learning in a focused manner to achieve enhanced vector representation of entities and relations in a knowledge graph is the aim of the present invention.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY

In view of the shortcomings of the prior art, the present invention provides a method for text-enhanced knowledge graph joint representation learning, wherein at least comprising: learning a structure vector representation based on entity objects and their relation linking in a knowledge graph and forming structure representation vectors; discriminating credibility of reliable feature information and building an attention mechanism model, aggregating vectors of different sentences and obtain association-discriminated text representation vectors; and building a joint representation learning model, and using a dynamic parameter-generating strategy to perform joint learning for the text representation vectors and the structure representation vectors based on the joint representation learning model.

In order to solve the problems of existing knowledge graphs about sparse relations, incomplete structure knowledge, and lack of effective use of external text information from knowledge bases in representation learning, the present invention provides a knowledge joint representation learning method incorporating text description information. The method uses a convolutional neural network model to extract reliable feature information from text data, and discriminates feature credibility of different relations based on an attention mechanism, thereby realizing enhanced representation of entity relation structure vectors in existing knowledge bases, and obtaining a knowledge representation model that is rich in semantic information. The method further uses a convolutional neural network to perform dimensional enhancement training on joint representation vectors, so as to further capture associated features among implicit vectors, and better cluster discriminate association of entity/relation vectors in the knowledge graph, and last finishes completion and reasoning of the knowledge graph with vector computation of the entities and relations.

Preferably, the method further comprises: the reliable feature information is obtained by extraction based on convolutional neural network model learning, in which, entity-related text description information is represented based on the convolutional neural network model learning, so as to provide semantic enhancement to the structure representation vectors.

The present invention uses the convolutional neural network model to learn representation entity-related text description information, and therefore can maintain spatial consistency between its text representation vectors and structure representation vectors.

Preferably, representing the entity-related text description information based on the convolutional neural network model learning comprises: associating entity-relation linking data in the knowledge graph with texts and automatically labeling entities that have identical names; performing local semantic combination on word vector sequences in the texts based on context relation of word vector sets in the texts and extracting local semantic features of the sentences; and training sequence vectors in the texts based on a convolutional neural network model, and optimizing vector semantics of sentence representation through iterative training based on a non-linear activation function.

Preferably, discriminating credibility of reliable feature information comprises: acquiring sentence sets with entity pair concurrence and extracting corresponding entity structure representation vectors and/or sentence neighboring word vectors; and performing vector optimization on entities with specified names based on location feature information and word-order feature information of entity pairs in the sentences, so that a certain level of discrimination exists among representation vectors of the same entity in different said sentences.

Preferably, aggregating vectors of different sentences and obtaining association-discriminated text representation vectors further comprises: selecting and performing information reengineering according to location features of the structure representation vectors in the knowledge graph so as to form the text representation vectors.

Preferably, forming the text representation vectors further comprises: establishing an attention weight matrix, and computing attention weight values of the sentences based on structure entity vectors in the knowledge graph and relation representation vectors of the sentences using the attention weight matrix. Thereby, vectors of different sentences can be aggregated to form association-discriminated text relation representation vectors.

Preferably, the method further comprises: setting up a threshold mechanism to perform comprehensive weight addition on the structure representation vectors and the text representation vectors. Selection of the threshold is made according to complexity of data. Particularly, a knowledge graph having a more complicated structure has structured vector representation with a greater weight. For knowledge graphs of sparse lands, textual vector representation takes a larger share.

Preferably, the method further comprises: mining implicit association features among the vectors based on the convolutional neural network model, and performing knowledge association prediction and/or data intelligence reasoning for missing relation in the knowledge graph. Then joint learning can be performed using the learned representation vectors based on the triad structure and the representation vectors based on the text description, so as to obtain enhanced representation vectors of co-occurrence entities in the texts, thereby completing the existing knowledge base through better use of external text corpus information.

The present invention further provides a device for text-enhanced knowledge graph joint representation learning, wherein the device at least comprises: a structure representation vector generating module, for learning a structure vector representation based on entity objects in a knowledge graph and their relation linking and forming structure representation vectors; a text representation vector generating module, for building an attention mechanism model to discriminate credibility of reliable feature information, and aggregating vectors of different sentences and obtain association-discriminated text representation vectors; and a joint representation learning module, for using a dynamic parameter-generating strategy to perform joint learning for the text representation vectors and the structure representation vectors based on the joint representation learning model.

Preferably, the device further comprises a prediction module and/or a reasoning module, the prediction module mining implicit association features among the vectors based on a convolutional neural network model, and performing knowledge association prediction for missing relation in the knowledge graph; and the reasoning module mining implicit association features among the vectors based on the convolutional neural network model, and performing data intelligence reasoning for the missing relations in the knowledge graph.

DETAILED DESCRIPTION OF THE INVENTION

Figure 1:
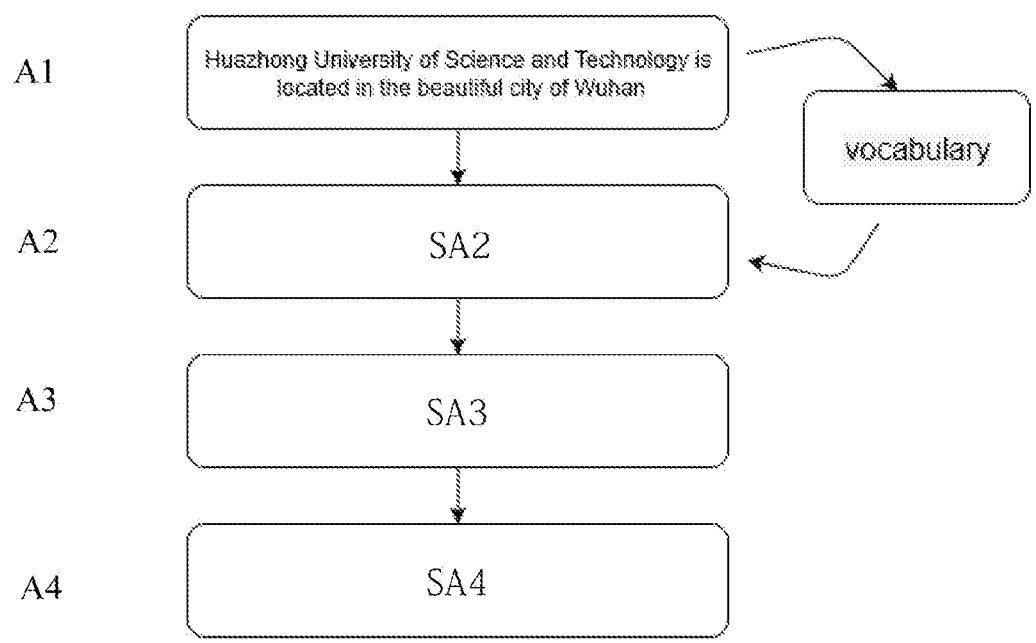
FIG. 1 is a structural block diagram of a text processing network according to the present invention.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

In view of the shortcomings of the prior art, the present invention provides a method or a device for text-enhanced knowledge graph joint representation learning, which is also referred to as a system for text-enhanced knowledge graph joint representation learning. The present invention further provides a text-incorporating knowledge graph representation learning model.

The present invention discloses a novel text-incorporating knowledge graph representation learning model TECRL, which selective enhances entity/relation vectors based on significance of associated texts, so as to provide improved semantic expressiveness, and uses 2D convolution operations to train joint representation vectors. As compared to traditional translation models that use the score function for training, the disclosed model has better performance in tasks like link prediction and triad classification.

Embodiment 1

The present invention provides a method for text-enhanced knowledge graph joint representation learning, wherein the method at least comprising: S1: learning a structure vector representation based on entity objects and their relation linking in a knowledge graph and forming structure representation vectors; S2: building an attention mechanism model for discriminating credibility of reliable feature information based on a threshold as, aggregating vectors of different sentences and obtain association-discriminated text representation vectors; and S3: building a joint representation learning model, and using a dynamic parameter-generating strategy to perform joint learning for the text representation vectors and the structure representation vectors based on the joint representation learning model.

In order to solve the problems of existing knowledge graphs about sparse relations, incomplete structure knowledge, and lack of effective use of external text information from knowledge bases in representation learning, the present invention provides a knowledge joint representation learning method incorporating text description information. The method uses a convolutional neural network model to extract reliable feature information from text data, and discriminates feature credibility of different relations based on an attention mechanism, thereby realizing enhanced representation of entity relation structure vectors in existing knowledge bases, and obtaining a knowledge representation model that is rich in semantic information. The method further uses a convolutional neural network to perform dimensional enhancement training on joint representation vectors, so as to further capture associated features among implicit vectors, and better cluster discriminate association of entity/relation vectors in the knowledge graph, and last finishes completion and reasoning of the knowledge graph with vector computation of the entities and relations.

Preferably, the disclosed method further comprises: S4: extraction based on convolutional neural network model learning so as to obtain the reliable feature information is obtained, wherein entity-related text description information is represented based on the convolutional neural network model learning, so as to provide semantic enhancement to the structure representation vectors.

The present invention uses the convolutional neural network model to learn representation entity-related text description information, and therefore can maintain spatial consistency between its text representation vectors and structure representation vectors.

In the present invention, learning a structure vector representation based on linking between entity objects and their relations in a knowledge graph is realize by the following steps S11 and S12.

S11 involves mirroring data of the entities and relations in the knowledge graph to a low-dimension continuous vector space, so that a certain level of computational-sum-based association exists among entity representation vectors with linking relations.

Preferably, data of the entities and relations in the knowledge graph are mirrored into a low-dimension continuous vector space using the translation model, the text convolutional neural network model, or the like.

S12 involves building a non-linear training function $P_{(h,r)}=[\overline{h;r}] \cdot W_{hr}+b_{hr}$, and performing vector dimensional optimization training, so as to enhance semantic interpretability of the structure vectors of the knowledge graph. h and r represent tuple information in sentences, $W_{hr}$ represents a two-dimensional kernel, and $b_{hr}$ represents a bias matrix.

Preferably, building the attention mechanism model to discriminate credibility of reliable feature information at least comprising: S21: for a sentence s containing the entity pair (h, t), acquiring sentence sets with entity pair concurrence and extracting corresponding entity structure representation vectors and/or sentence neighboring word vectors, which is favorable to reasoning computation and helps to obtain the relation vector of the text representation vector; and S22: based on location feature information and word-order feature information of entity pairs in the sentences performing vector optimization on entities with specified names, so that a certain level of discrimination exists among representation vectors of the same entity in different said sentences.

Preferably, similarity of sentences is computed using an equation $$\cos(\eta) = \frac{h_s \cdot h'_s}{\|h_s\| \|h'_s\|},$$

and a threshold $\sigma_s$ for a value of the similarity is set. Therein, $\cos(\eta)$ represents the similarity value, and $h_s$ represents the structure vector.

Where the similarity value of the text vector representation corresponding to the candidate set of specified vectors in the knowledge graph is smaller than $\sigma_s$, it is determined that the vectors lack for text information, and are unreliable feature information. Where the similarity value of the text vector representation corresponding to the candidate set of specified vectors in the knowledge graph is not smaller than as, it is determined that the vectors do not lack for text information, and are reliable feature information. A structure representation vector satisfying the threshold is selected as the text relation representation vector.

Preferably, building the attention mechanism model to discriminate credibility of reliable feature information is achieved by: S23: selecting and performing information reengineering according to location features of the structure representation vectors in the knowledge graph so as to form the text representation vectors.

Preferably, forming the text representation vector is achieved by: S24: establishing an attention weight matrix, and computing attention weight values of the sentences based on structure entity vectors in the knowledge graph and relation representation vectors of the sentences using the attention weight matrix, so as to aggregate vectors of different sentences and obtain association-discriminated text relation representation vector.

Preferably, representing the entity-related text description information based on the convolutional neural network model learning is achieved by the following steps S41 through S43.

S41 involves associating entity-relation linking data in the knowledge graph with texts and automatically labeling entities that have identical names, which is helpful to realize joint modeling for the knowledge graph and the texts, thereby forming an efficient entity-linking method, wherein, the step specifically including building a graph using the relations among candidate entities, incorporating named entities into the graph as nodes, and automatically labeling entities that have identical names in the knowledge graph appearing in the texts; S42 involves performing local semantic combination on word vector sequences in the texts based on context relation of word vector sets in the texts and extracting local semantic features of the sentences.

Preferably, training is performed for labelled vocabulary in the texts using a vector-generating tool, word2vec, so as to obtain all the word vector sets. According to the context relations among the texts, local semantic combination is performed for word vector sequences in the texts, thereby extracting local semantic features of the sentences in the level of word vectors.

S43 involves training sequence vectors in the texts based on a convolutional neural network model, and optimizing vector semantics of sentence representation through iterative training based on a non-linear activation function, so as to improve stability of the model, and at last performing dimensional consistency processing on the output vectors using a max pooling operation.

Specifically, the non-linear activation function is $Q_i=\tanh(W_s \cdot x_i + b_s)$, where $W_s \in R^{k \times k_h}$ is a weight matrix, and $b_s \in R^k$ is a bias vector, $x_i$ is vector representation of every word, and i represents the serial number of the word.

Preferably, the disclosed method for text-enhanced knowledge graph joint representation learning further comprises: S5: setting up a threshold mechanism to perform comprehensive weight addition on the structure representation vectors and the text representation vectors. Selection of the threshold is made according to complexity of data. Particularly, a knowledge graph having a more complicated structure has structured vector representation with a greater weight. For knowledge graphs of sparse lands, textual vector representation takes a larger share.

Preferably, the method further comprises: S6: mining implicit association features among the vectors based on the convolutional neural network model, and performing knowledge association prediction and/or data intelligence reasoning for missing relation in the knowledge graph. Then joint learning can be performed using the learned representation vectors based on the triad structure and the representation vectors based on the text description, so as to obtain enhanced representation vectors of co-occurrence entities in the texts, thereby completing the existing knowledge base through better use of external text corpus information.

The present invention achieves processing the text data to form text representation vectors, processing the knowledge graph to form structure representation vectors, and performing joint representation learning for the text representation vectors and the structure representation vectors through the process detailed below.

Given the principle of translation model training, assuming that all the entity relation vectors in the knowledge graph are at the same dimension, vector representation of triad information may be regarded as $(h_s, r_s, t_s)$. In an ideal state, true triads existing in the knowledge base should satisfy $h_s + r_s = t_s$, and for any false triad, the result of $h_s + r_s$ will be far from $t_s$. Thus, a score function is defined for the training objective of the translation model, which is in the form of: $f_r(h,t) = \|h + r - t\|_2$. The smaller the value of the score function is, the more likely it is that the triad is true, and vice versa.

For entity vectors $h_s$ or $t_s$ in the knowledge graph, entity mentions appear in the text sentences are represented in the form of shared vectors, thereby realizing semantic mapping between the entities and the texts. Through an efficient entity linking method, the original text information is automatically labeled, mainly about realizing vector labeling of the entity mentions by processing the input sentence. All the stop words are removed from the sentences, a training expected vocabulary table is built. Training is performed using the tool word2vec, so as to obtain all the word vector sets V. A convolutional neural network model is used to embed word vectors into text context, before the text entity vectors and the text relation vectors are classified and processed according to the difference among the entity mentions contained in the sentences.

FIG. 1 provides an algorithm flow chart for embedding word vectors into text context according to the present invention.

A textual content is input in the input layer A1. The textual content may be, for example, "Huazhong University of Science and Technology is located in the beautiful city of Wuhan".

At SA2, the sentence input at the input layer is now processed in the word representation layer A2 by labeling the vectors of the entities. After all the stop words are removed from the sentence, the training expected vocabulary table is built. Specifically, all the word vectors are trained in the word representation layer using the word2vec tool, and local semantic combination is performed on every word based on the vectors of the vocabulary table and the local location feature vectors of the sentence, thereby extracting local semantic features of the sentence at the level of word vectors.

At SA3, in the convolutional layer A3, associated text descriptions are embedded into the vector representation using the text convolutional network model CNN, and sliding windows are set to locally compose the word vector sequences of the sentence into local semantic features of the sentence. Then the text entity vectors and the relation vectors are analyzed according to the difference of entity of reference in the sentence.

At SA4, in the output layer A4, the max pooling operation is performed to optimize the feature information of the text representation vectors and the splicing maximum vectors, so as to obtain the version of the text representation vectors that exists after the training operation of the convolutional neural network model. Then the dimensional matrix conversion operation can be performed to obtain text representation vectors, thereby finishing operation in the output layer.

After the word vectors are embedded into the text context, the attention mechanism model combines semantic features of different co-occurrence sentences in the specified entity pair. For the attention mechanism model to predict the entity pair relation r, information in the sentence is selected according to the association between individual sentences and the entity pair relation and different sentences are combined using different weights. For the sentence sequence s={x1, x2, . . . , xn}, the location feature indicates the relative location of every word and the entity mention, which is an effectively representation of the text in terms of semantics. Every word vector xi in the sentence s may be composed of two parts. One is a word vector $w \in R^k$ based on the vocabulary table, the other is a location feature vector p. In a sentence, the location of an individual word w with respect to two entity mentions is represented as [d1,d2], where d1 and d2 represent the direction and the distance with respect to the head and tail entities, respectively, and are mapped into two kp-dimension vectors in the attention mechanism model. The distance vector is subject to head-to-tail splicing so as to obtain the location feature vector $p \in R^{2*kp}$. The word vector and the location feature vector of the word are then subject to splicing, so as to obtain the vector representation of that word, i.e., $x_i=[W_i; P_i]$.

A sentence set containing the entity pair (h, t) is denoted as $S_{(h,t)}$. Therein, $S_{(h,t)}=s_1, s_2, \ldots, s_m$ means there are m sentences. Every sentence can be encoded into a relation vector O using the convolutional neural network model of the present invention. The sentence then can be subject to dimensional conversion in, for example, the hidden layer and converted to have the dimension of the entity relation vectors of the structure information of the knowledge graph, for convenient analysis and computation.

Specifically, the convolutional neural network model is expressed as: $E_i=\tanh(W_s O_i+b_s)$, where $E_i$ represents a vector, $W_s \in R^{k \times k_h}$ is a weight matrix, and $b_s \in R^k$ is a bias vector.

Preferably, the structure representation vectors comprise structure entity vectors and relation vectors. According to the inherent structure entity vectors of the knowledge graph and the relation vector representation represented by the sentence, computation is performed to figure out the attention weight value of an individual sentence:

$$a_i = \frac{\exp((t-h) \cdot E_i)}{\sum_{j=1}^{m} \exp((t-h) \cdot E_j)},$$

where t−h is the structure vector representation based on the knowledge graph itself. Assuming that h+r≈t, this is used to represent the potential relation between an entity pair (h,t). Using the form of the inner product of the vectors, association weighting between individual sentences and the specified entity pair can be effectively represented. Therein, $E_j$ represents the vector of the jth sentence.

The present invention then aggregates all the vectors of the sentence associated with the entity pair to obtain the final text representation vector, which is expressed by: $r_t=\sum_j^m a_j O_j$, where $r_t$ represents the final text representation vector; $a_j$ represents the attention weight value of the jth sentence; and $O_j$ represents of the relation vector of the jth sentence.

The obtained structure representation vector based on the triad structure and the text representation vector based on the text description are subject to joint learning, so as to obtain enhanced representation vectors of co-occurrence entities in the text, thereby better using external text corpus information for the purpose of completion of the existing knowledge base.

Specifically, for joint text vector representation of entities and relations, in order to fully consider its structure vector representation and text vector representation, a dynamic parameter-generating strategy is adopted. The dynamic parameter-generating strategy is as below. A knowledge graph having a more complicated structure has structured vector representation with a greater weight. For knowledge graphs of sparse lands, textual vector representation takes a larger share. The dynamic parameter-generating strategy may be expressed as: $h=h_s \cdot \theta_h+h_t \cdot (1-\theta_h)$, $r=r_s \cdot \theta_r+r_t \cdot (1-\theta_r)$, $t=t_s \cdot \theta_t+t_t \cdot (1-\theta_t)$, wherein the values of parameters $\theta_h$, $\theta_r$ and $\theta_t$ are all at [0,1], which are obtained using a logistic sigmoid function.

Computation of the parameters $\theta_h$, $\theta_r$ and $\theta_t$ are made using the following equation: $\theta=\sigma(\theta')$, where $\theta' \in R^k$, initialized using structured variables. During training, the number of text descriptions associated with the entity or the relation is figured out to change the value. Then the final value after the training is taken as the weighting parameter for the joint representation learning model.

The learning result obtained using the joint representation learning model is useful for knowledge association prediction and data intelligence reasoning. For example, experiment data as a learning result are usually used as a criterion for measuring whether the obtained link prediction or reasoning triad classification is accurate enough.

Embodiment 2

Figure 2:
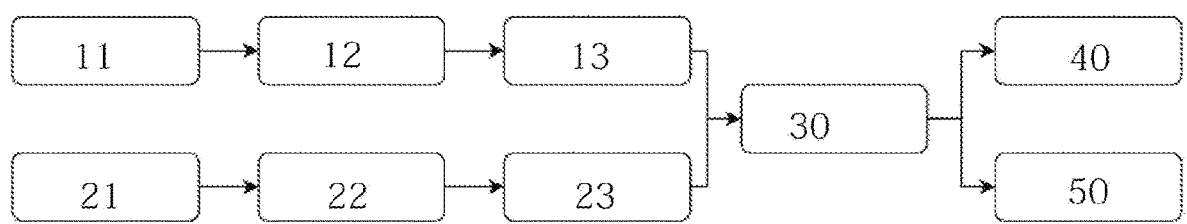
FIG. 2 is a logic module diagram of a text-enhanced joint training model.

In the present embodiment, the present invention further provides a text-enhanced knowledge graph joint representation learning device, as shown in FIG. 2. The device at least comprises a structure representation vector generating module, a text representation vector generating module, and a joint representation learning module.

The structure representation vector generating module is for learning a structure vector representation based on entity objects and their relation linking in a knowledge graph and forming structure representation vectors.

The text representation vector generating module is for building an attention mechanism model to discriminate credibility of reliable feature information, and aggregate vectors of different sentences and obtain association-discriminated text representation vectors.

The joint representation learning module is for using a dynamic parameter-generating strategy to perform joint learning for the text representation vectors and the structure representation vectors based on the joint representation learning model.

Preferably, the text representation vector generating module, the structure representation vector generating module and the joint representation learning module of the present invention may each be one or more of an application specific integrated circuit, a server, a server farm, and a cloud server.

The structure representation vector generating module is operated to perform the following steps.

The step S11 involves mirroring data of the entities and relations in the knowledge graph to a low-dimension continuous vector space, so that a certain level of computational-sum-based association exists among entity representation vectors with linking relations.

Preferably, data of the entities and relations in the knowledge graph are mirrored into a low-dimension continuous vector space using the translation model and the text convolutional neural network model.

The step S12 involves building a non-linear training function $P_{(h,r)}=[\bar{h};\bar{r}] \cdot W_{hr}+b_{hr}$, and performing vector dimensional optimization training, so as to enhance semantic interpretability of the structure vectors of the knowledge graph. h and r represent tuple information in the sentence, $W_{hr}$ represents the two-dimensional kernel, and $b_{hr}$ represents the bias matrix.

Preferably, the text representation vector generating module is operated to perform the following process: building an attention mechanism model to discriminate credibility of reliable feature information. This involves the following steps: S21: for a sentence s containing the entity pair (h, t), acquiring sentence sets with entity pair concurrence and extracting corresponding entity structure representation vectors and/or sentence neighboring word vectors, which is favorable to reasoning computation and helps to obtain the relation vector of the text representation vector; and S22: based on location feature information and word-order feature information of entity pairs in the sentences performing vector optimization on entities with specified names, so that a certain level of discrimination exists among representation vectors of the same entity in different said sentences.

Preferably, the similarity value of the sentence is computed using the equation $$\cos(\eta) = \frac{h_s \cdot h'_s}{\|h_s\| \|h'_s\|},$$

and a threshold $\sigma_s$ is set for similarity value. Therein, $\cos(\eta)$ represents the similarity value and $h_s$ represents the structure vector.

Where the similarity value of the text vector representation corresponding to the candidate set of specified vectors in the knowledge graph is smaller than $\sigma_s$, it is determined that the vectors lack for text information, and are unreliable feature information. Where the similarity value of the text vector representation corresponding to the candidate set of specified vectors in the knowledge graph is not smaller than $\sigma_s$, it is determined that the vectors do not lack for text information, and are reliable feature information.

A structure representation vector satisfying the threshold is selected as the text relation representation vector.

Preferably, building the attention mechanism model to discriminate credibility of reliable feature information further comprises a step:

S23: selecting and performing information reengineering according to location features of the structure representation vectors in the knowledge graph so as to form the text representation vectors.

This further involves establishing an attention weight matrix, and computing attention weight values of the sentences based on structure entity vectors in the knowledge graph and relation representation vectors of the sentences using the attention weight matrix, so as to aggregate vectors of different sentences and obtain association-discriminated text relation representation vector.

The text representation vector generating module at least comprises a text entering module 11, an entity labeling module 12, and a text representation vector module 13.

The text input module 11 is for input and extraction of textual information. The text entering module 11 may be any terminal capable of extracting, collecting and inputting information, such as a mobile terminal device, an immovable computer and the like. The mobile terminal device may be a smart wearable device, a mobile phone, a tablet computer, or an operating platform allowing input of information. The entity labeling module 12 and the text representation vector module 13 may each be one or more of an application specific integrated circuit, a server, a server farm, and a cloud server having computing and processing functions.

The entity labeling module 12 uses the entity labeling method of the text-enhanced convolutional representation learning (TECRL) model to automatize the process of labeling information corresponding to the text data.

Therein, the entity labeling module is operated to perform the following process: associating entity-relation linking data in the knowledge graph with texts and automatically labeling entities that have identical names; performing local semantic combination on word vector sequences in the texts based on context relation of word vector sets in the texts and extracting local semantic features of the sentences; and training sequence vectors in the texts based on a convolutional neural network model, and optimizing vector semantics of sentence representation through iterative training based on a non-linear activation function.

The text representation vector module 13 is for selecting and performing information reengineering according to location features of the structure representation vectors in the knowledge graph so as to form the text representation vectors.

Specifically, the text representation vector module is operated to perform the following process: using the attention mechanism model to discriminate credibility of reliable feature information. This involves acquiring sentence sets with entity pair concurrence and extracting corresponding entity structure representation vectors and/or sentence neighboring word vectors; and based on location feature information and word-order feature information of entity pairs in the sentences performing vector optimization on entities with specified names, so that a certain level of discrimination exists among representation vectors of the same entity in different said sentences.

Therein, for the attention mechanism model to predict the entity pair relation r, information in the sentence is selected according to the association between individual sentences and the entity pair relation and different sentences are combined using different weights. For the sentence sequence s={x1, x2, . . . , xn}, the location feature indicates the relative location of every word and the entity mention, which is an effectively representation of the text in terms of semantics. Every word vector xi in the sentence s may be composed of two parts. One is a word vector w∈ Rk based on the vocabulary table, the other is a location feature vector p. In a sentence, the location of an individual word w with respect to two entity mentions is represented as [d1,d2], where d1 and d2 represent the direction and the distance with respect to the head and tail entities, respectively, and are mapped into two kp-dimension vectors in the attention mechanism model. The distance vector is subject to head-to-tail splicing so as to obtain the location feature vector p∈ $R^{2*kp}$. The word vector and the location feature vector of the word are then subject to splicing, so as to obtain the vector representation of that word, i.e., $x_i=[W_i;P_i]$.

A sentence set containing the entity pair (h, t) is denoted as $S_{(h,t)}$. Therein, $S_{(h,t)}=s_1, s_2, \ldots, s_m$ means there are m sentences. Every sentence can be encoded into a relation vector O using the convolutional neural network model of the present invention. The sentence then can be subject to dimensional conversion in, for example, the hidden layer and converted to have the dimension of the entity relation vectors of the structure information of the knowledge graph, for convenient analysis and computation. Specifically, it is expressed as: $E_i=\tanh(W_s O_i+b_s)$, where $W_s \in R^{k \times k_h}$ is a weight matrix, and $b_s \in R^k$ is a bias vector.

According to the inherent structure entity vectors of the knowledge graph and the relation vector representation represented by the sentence, computation is performed to figure out the attention weight value of an individual sentence:

$$a_i = \frac{\exp((t-h) \cdot E_i)}{\sum_{j=1}^{m} \exp((t-h) \cdot E_j)},$$

where t−h is the structure vector representation based on the knowledge graph itself. Assuming that h+r≈t, this is used to represent the potential relation between an entity pair (h,t). Using the form of the inner product of the vectors, association weighting between individual sentences and the specified entity pair can be effectively represented. Then the final text representation vector can be obtained by aggregating the vector of all the sentences associated with the entity pairs and expressed as: $r_t = \Sigma_j^m a_j O_j$.

The structure representation vector generating module at least comprises a knowledge graph input module 21, a translation training module 22, and a structure representation vector module 23.

The knowledge graph input module 21 is for storing, inputting or extracting entity objects and their relation linking from the knowledge graph. knowledge graph input module 21 may be any terminal capable of extracting, collecting and inputting information, such as a mobile terminal device, an immovable computer and the like. The mobile terminal device may be a smart wearable device, a mobile phone, a tablet computer, or an operating platform allowing input of information.

The translation training module 22 and the structure representation vector module 23 may each be one or more of an application specific integrated circuit, a server, a server farm, and a cloud server having computing and processing functions.

The translation training module 22 is provided with the translation model TransE. The translation training module 22 is operated to perform the following process: processing the input knowledge graph using the training method of the translation model TransE, so as to obtain vectors in the form of structured text representation that are further processed using the translation model to obtain corresponding triad structure representation vectors.

Specifically, assuming that all the entity relation vectors in the knowledge graph are at the same dimension, vector representation of triad information may be regarded as $(h_s, r_s, t_s)$. In an ideal state, true triads existing in the knowledge base should satisfy $h_s + r_s = t_s$, and for any false triad, the result of $h_s + r_s$ will be far from $t_s$. Thus, a score function is defined for the training objective of the translation model, which is in the form of: $f_r(h, t) = \|h + r - t\|_2$. The smaller the value of the score function is, the more likely it is that the triad is true, and vice versa.

The structure representation vector module 23 is operated to perform the following process: for entity vectors $h_s$ or $t_s$ in the knowledge graph, representing entity mentions appear in the text sentences in the form of shared vectors, thereby realizing semantic mapping between the entities and the texts.

The joint representation learning module 30 is operated to perform the following process: performing joint learning based on the representation vectors of the triad structure and based on the representation vector of the text description so as to obtain enhanced representation vectors of the co-occurrence entities in the text. Specifically, the dynamic parameter-generating strategy model, $h = h_s \cdot \theta_h + h_{t'} \cdot (1 - \theta_h)$, $r = r_s \cdot \theta_r + r_t (1 - \theta_r)$, $t = t_s + \theta_t + t_{t'} (1 - \theta_t)$, is used to perform learning training. Therein, the values of the parameters $\theta_h$, $\theta_r$ and $\theta_t$ are all at [0,1].

Preferably, the device further comprises prediction module 40 and/or reasoning module 50.

The operation prediction module 40 is operated to perform the following process: mining implicit association features among the vectors based on the convolutional neural network model, and performing knowledge association prediction for missing relation in the knowledge graph.

The reasoning module 50 is operated to perform the following process: mining implicit association features among the vectors based on the convolutional neural network model, and performing data intelligence reasoning for the missing relations in the knowledge graph.

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. A method for text-enhanced knowledge graph joint representation learning, at least comprising:
   learning a structure vector representation based on entity objects and their relation linking in a knowledge graph and forming structure representation vectors;
   discriminating credibility of reliable feature information and building an attention mechanism model, aggregating vectors of different sentences and obtaining association-discriminated text representation vectors; and
   building a joint representation learning model, and
   using a dynamic parameter-generating strategy to perform joint learning for the text representation vectors and the structure representation vectors based on the joint representation learning model,
   wherein:
   the reliable feature information is obtained by extraction based on convolutional neural network model learning, in which,
   entity-related text description information is represented based on the convolutional neural network model learning, so as to provide semantic enhancement to the structure representation vectors, and
   wherein representing the entity-related text description information based on the convolutional neural network model learning comprises:
   associating entity-relation linking data in the knowledge graph with texts and automatically labeling entities that have identical names;
   performing local semantic combination on word vector sequences in the texts based on context relation of word vector sets in the texts and extracting local semantic features of the sentences; and
   training sequence vectors in the texts based on a convolutional neural network model, and optimizing vector semantics of sentence representation through iterative training based on a non-linear activation function, and
   mirroring data of the entities and relations in the knowledge graph to a low-dimension continuous vector space, so that a certain level of computational-sum-based association exists among entity representation vectors with linking relations; and
   wherein discriminating credibility of reliable feature information comprises:
   acquiring sentence sets with entity pair concurrence and extracting corresponding entity structure representation vectors and/or sentence neighboring word vectors; and
   performing vector optimization on entities with specified names based on location feature information and word-order feature information of entity pairs in the sentences, so that a certain level of discrimination exists among representation vectors of the same entity in different said sentences; and
   wherein similarity of sentences is computed and a threshold vale is assigned for degree of similarity, and wherein when the similarity value of the text vector representation corresponding to the candidate set of specified vectors in the knowledge graph is smaller than said threshold value, it is determined that the vectors lack for text information, and are unreliable feature information, and wherein when the similarity value of the text vector representation corresponding to the candidate set of specified vectors in the knowledge graph is not smaller than said threshold value, it is determined that the vectors do not lack for text information, and are reliable feature information, and wherein a structure representation vector satisfying said threshold is selected as a text relation representation vector, and wherein aggregating vectors of different sentences and obtaining association-discriminated text representation vectors further comprises:

selecting and performing information reengineering according to location features of the structure representation vectors in the knowledge graph so as to form the text representation vectors.

2. The method of claim 1, wherein forming the text representation vectors further comprises:

establishing an attention weight matrix, and computing attention weight values of the sentences based on structure entity vectors in the knowledge graph and relation representation vectors of the sentences using the attention weight matrix.

3. The method of claim 1, wherein the method further comprises:

setting up a threshold mechanism to perform comprehensive weight addition on the structure representation vectors and the text representation vectors.

4. The method of claim 3, wherein the method further comprises:

mining implicit association features among the vectors based on the convolutional neural network model, and performing knowledge association prediction and/or data intelligence reasoning for missing relation in the knowledge, graph.

5. The method of claim 4, wherein the dynamic parameter-generating strategy comprises:

a knowledge graph having a more complicated structure has structured vector representation with a greater weight, for knowledge graphs of sparse lands, textual vector representation takes a larger share.

6. The method of claim 3, wherein the dynamic parameter-generating strategy is expressed as: $h = h_s \cdot \theta_h + h_t \cdot (1-\theta_h)$, $r = r_s \cdot \theta_r + r_t \cdot (1-\theta_r)$, $t = t_s \cdot \theta_t + t_t \cdot (1-\theta_t)$, wherein the values of parameters $\theta_h$, $\theta_r$ and $\theta_t$ are all at $[0,1]$, which are obtained using a logistic sigmoid function.

* * * * *